(12) United States Patent
Nakajima

(10) Patent No.: US 8,023,026 B2
(45) Date of Patent: Sep. 20, 2011

(54) SOLID-STATE IMAGING APPARATUS FOR OVERCOMING EFFECTS OF POWER FLUCTUATIONS

(75) Inventor: Shinichi Nakajima, Koganei (JP)

(73) Assignee: Olympus Corporation, Tokyo (JP)

( * ) Notice: Subject to any disclaimer, the term of this patent is extended or adjusted under 35 U.S.C. 154(b) by 693 days.

(21) Appl. No.: 11/941,571

(22) Filed: Nov. 16, 2007

(65) Prior Publication Data

US 2008/0136950 A1    Jun. 12, 2008

(30) Foreign Application Priority Data

Nov. 17, 2006 (JP) ................................ 2006-311161

(51) Int. Cl.
*H04N 3/14* (2006.01)
*H04N 5/335* (2006.01)

(52) U.S. Cl. ........................................ 348/308; 348/294
(58) Field of Classification Search .................. 348/294, 348/308

See application file for complete search history.

(56) References Cited

U.S. PATENT DOCUMENTS

| | | | | |
|---|---|---|---|---|
| 4,994,900 | A * | 2/1991 | Ebara et al. | 348/560 |
| 5,434,437 | A * | 7/1995 | Itakura et al. | 257/231 |
| 2001/0015831 | A1 | 8/2001 | Lauxtermann et al. | |
| 2004/0130757 | A1 | 7/2004 | Mabuchi | |
| 2005/0140664 | A1* | 6/2005 | Kawamura et al. | 345/204 |
| 2005/0167707 | A1* | 8/2005 | Funaki | 257/291 |
| 2007/0221823 | A1* | 9/2007 | Xu et al. | 250/208.1 |
| 2008/0018760 | A1* | 1/2008 | Nakajima | 348/296 |

FOREIGN PATENT DOCUMENTS

| | | | |
|---|---|---|---|
| JP | 11261896 A | | 9/1999 |
| JP | 2007251680 A | * | 9/2007 |
| WO | 2006/124346 A1 | | 11/2006 |

OTHER PUBLICATIONS

Communication dated Dec. 10, 2009, issued in corresponding European Patent Application No. 07022020.7.
European Search Report dated Oct. 29, 2008, issued in corresponding European Patent Application No. 07022020.7.

* cited by examiner

*Primary Examiner* — Jason Chan
*Assistant Examiner* — Cynthia Calderon
(74) *Attorney, Agent, or Firm* — Westerman, Hattori, Daniels & Adrian, LLP

(57) ABSTRACT

A solid-state imaging apparatus includes: a pixel section having two-dimensionally arranged pixels, each having a photoelectric conversion means, a memory means, a transfer means, a first reset means for resetting the memory means, a second reset means for resetting the photoelectric conversion means, and a read means for reading the photoelectric conversion signal of the memory means; and a controller for effecting a control so that, after passage of a predetermined time subsequently to the rendering of a concurrent reset by the second reset means on the photoelectric conversion means of all pixels, a transfer of the photoelectric conversion signal is concurrently effected by the transfer means to the memory means of all pixels, and the reading by the read means is temporarily halted at least at one or the other of timings of a start and a release of the concurrent reset by the second reset means.

6 Claims, 13 Drawing Sheets

FIG. 13

| | |
|---|---|
| 1 | READ |
| 2 | READ |
| 3 | OMITTED |
| 4 | OMITTED |
| 5 | READ |
| 6 | READ |
| 7 | OMITTED |
| 8 | OMITTED |
| 9 | READ |
| 10 | READ |
| 11 | OMITTED |
| 12 | OMITTED |
| 13 | READ |
| 14 | READ |
| 15 | OMITTED |
| 16 | OMITTED |
| 17 | READ |
| 18 | READ |
| 19 | OMITTED |
| 20 | OMITTED |
| 21 | READ |
| 22 | READ |
| 23 | OMITTED |
| 24 | OMITTED |

FIG. 14

| | |
|---|---|
| 1 | READ |
| 2 | OMITTED |
| 3 | OMITTED |
| 4 | READ |
| 5 | OMITTED |
| 6 | OMITTED |
| 7 | READ |
| 8 | OMITTED |
| 9 | OMITTED |
| 10 | READ |
| 11 | OMITTED |
| 12 | OMITTED |
| 13 | READ |
| 14 | OMITTED |
| 15 | OMITTED |
| 16 | READ |
| 17 | OMITTED |
| 18 | OMITTED |
| 19 | READ |
| 20 | OMITTED |
| 21 | OMITTED |
| 22 | READ |
| 23 | OMITTED |
| 24 | OMITTED |

| | |
|---|---|
| 1 | READ |
| 2 | OMITTED |
| 3 | OMITTED |
| 4 | READ |
| 5 | OMITTED |
| 6 | OMITTED |
| 7 | OMITTED |
| 8 | OMITTED |
| 9 | READ |
| 10 | OMITTED |
| 11 | OMITTED |
| 12 | READ |
| 13 | OMITTED |
| 14 | OMITTED |
| 15 | OMITTED |
| 16 | OMITTED |
| 17 | READ |
| 18 | OMITTED |
| 19 | OMITTED |
| 20 | READ |
| 21 | OMITTED |
| 22 | OMITTED |
| 23 | OMITTED |
| 24 | OMITTED |

# SOLID-STATE IMAGING APPARATUS FOR OVERCOMING EFFECTS OF POWER FLUCTUATIONS

This application claims benefit of Japanese Patent Application No. 2006-311161 filed in Japan on Nov. 17, 2006, the contents of which are incorporated by this reference.

BACKGROUND OF THE INVENTION

The present invention relates to solid-state imaging apparatus, and more particularly relates to a solid-state imaging apparatus adapted to be capable of avoiding an effect of fluctuation in power supply or GND occurring due to the rendering of a concurrent reset operation of all pixels in a readout pixel region.

As a pixel of the pixel section to be used in a solid-state imaging apparatus having a concurrent shutter (also referred to as global shutter) function, one constructed as shown in FIG. 1 has been disclosed for example in Japanese Patent Application Laid-Open hei-11-261896. FIG. 1 includes: 1, a photoelectric conversion means such as a photodiode for receiving light for a predetermined time to accumulate photoelectric charge and effect its photoelectric conversion; 2, a memory means for retaining photoelectric charge of the photoelectric conversion means 1; 3, a transfer means for transferring photoelectric charge of the photoelectric conversion means 1 to the memory means 2; 4, a reset means for resetting the memory means 2 to the potential of a power supply; 5, a discharging means for resetting the photoelectric conversion means 1 to the potential of a power supply; and 6, a read means for reading electric charge of the memory means 2. These means constitute a unit pixel 7. A plurality of unit pixels 7 having such construction are then two-dimensionally arranged to constitute a pixel section. It should be noted that what is denoted by 21 is a vertical signal line for outputting signal read out by the read means 6.

Also referring to FIG. 1, ϕ TX1, ϕ RES(n), ϕ TX2, and ϕ SEL(n) are a transfer control signal, reset control signal, discharging control signal, and read control signal, respectively, for controlling ON/OFF of the transfer means 3, reset means 4, discharging means 5, and read means 6. It should be noted that suffix (n) of ϕ RES(n) and ϕ SEL(n) represents the location of row, and these control signals are outputted row by row of the pixel section from a vertical circuit (not shown).

An operation of the pixel section using the pixel shown in FIG. 1 will now be described with reference to a timing chart shown in FIG. 2. As shown in FIG. 2, the discharging control signal ϕ TX2 is driven to H level concurrently for all pixels so that a concurrent discharging operation of all pixels is started by the discharging means 5. After passage of a predetermined time, the discharging control signal ϕ TX2 is brought to L level concurrently for all pixels so that a concurrent discharging/reset operation of all pixels is completed by the discharging means 5 (time point $t_1$) and exposure of all pixels is started.

After passage of a predetermined exposure time, at the timing of concurrent transfer of all pixels, the transfer means 3 of all pixels are concurrently turned ON by the transfer control signal ϕ TX1. The photoelectric charges accumulated at the photoelectric conversion means 1 are thereby concurrently transferred to the memory means 2 (time point $t_2$). In other words, an exposure is ended. Here, in the timing chart shown in FIG. 2, a period indicated as Tint is an actual exposure period. Next after the end of the exposure, the read means 6 controlled by the read control signal ϕ SEL(n) is used to start read of signal level sequentially from the first row. It should be noted that, Vdd, Gnd in FIG. 2 indicate fluctuation in power supply (Vdd) and Gnd at the time of the concurrent discharging/reset operation by the discharging control signal ϕ TX2 and at the time of the concurrent transfer operation by the transfer control signal ϕ TX1.

SUMMARY OF THE INVENTION

In a first aspect of the invention, there is provided a solid-state imaging apparatus including: a pixel section having two-dimensionally arranged pixels, each having a photoelectric conversion means, a memory means for storing a photoelectric conversion signal of the photoelectric conversion means, a transfer means for transferring the photoelectric conversion signal to the memory means, a first reset means for resetting the memory means, a second reset means driven independently from the first reset means for resetting the photoelectric conversion means, and a read means for reading the photoelectric conversion signal of the memory means; and a controller for effecting a control so that, after passage of a predetermined time subsequently to the rendering of a concurrent reset by the second reset means on the photoelectric conversion means of all pixels in a read subject region, a transfer of the photoelectric conversion signal is concurrently effected by the transfer means from the photoelectric conversion means to the memory means of all pixels in the read subject region, and a reading of the photoelectric conversion signal stored at the memory means is effected by the read means, wherein when the concurrent reset by the second reset means is effected in a period during which the reading by the read means is effected, the reading by the read means is temporarily halted at least at one or the other of timings of a start or a release of the concurrent reset by the second reset means.

In a second aspect of the invention, the controller in the solid-state imaging apparatus according to the first aspect sets a period of the temporary halt by a unit of readout line of the pixel section.

In a third aspect of the invention, the controller in the solid-state imaging apparatus according to the first aspect causes reading by the read means to be effected in a period, after a predetermined period from the start of the concurrent reset by the second reset means, to the release of the concurrent reset by the second reset means.

In a fourth aspect of the invention, the controller in the solid-state imaging apparatus according to the third aspect sets the start of the concurrent reset by the second reset means within a vertical blanking period.

In a fifth aspect of the invention, the controller in the solid-state imaging apparatus according to the first aspect causes the concurrent reset by the second reset means to be effected with including a region not subjected to reading outside the read subject region.

In a sixth aspect of the invention, the solid-state imaging apparatus according to any one of the first to fifth aspects further includes an A/D converter for converting the photoelectric conversion signal into a digital signal, a line memory for effecting a delay of the digital signal for a period corresponding to the period of the temporary halt, and a select means for selecting between an output of the A/D converter and an output of the line memory, wherein the controller controls the select means so that an output of the line memory is selected and outputted until a release of the temporary halt and an output of the A/D converter after the release.

In a seventh aspect of the invention, the solid-state imaging apparatus according to any one of the first to fifth aspects further includes an A/D converter for converting the photoelectric conversion signal into a digital signal, and a buffer memory for transiently storing the digital signal, wherein the controller causes to halt the storing of the digital signal to the buffer memory for a period corresponding to the period of the temporary halt.

BRIEF DESCRIPTION OF THE DRAWINGS

FIG. 13 explains a manner of thinned-out readout in the solid-state imaging apparatus according to a fourth embodiment of the invention.

FIG. 14 explains another manner of thinned-out readout in the fourth embodiment.

DESCRIPTION OF THE PREFERRED EMBODIMENTS

Some embodiments of the solid-state imaging apparatus according to the invention will be described below with reference to the drawings.

Embodiment 1

Figure 1:
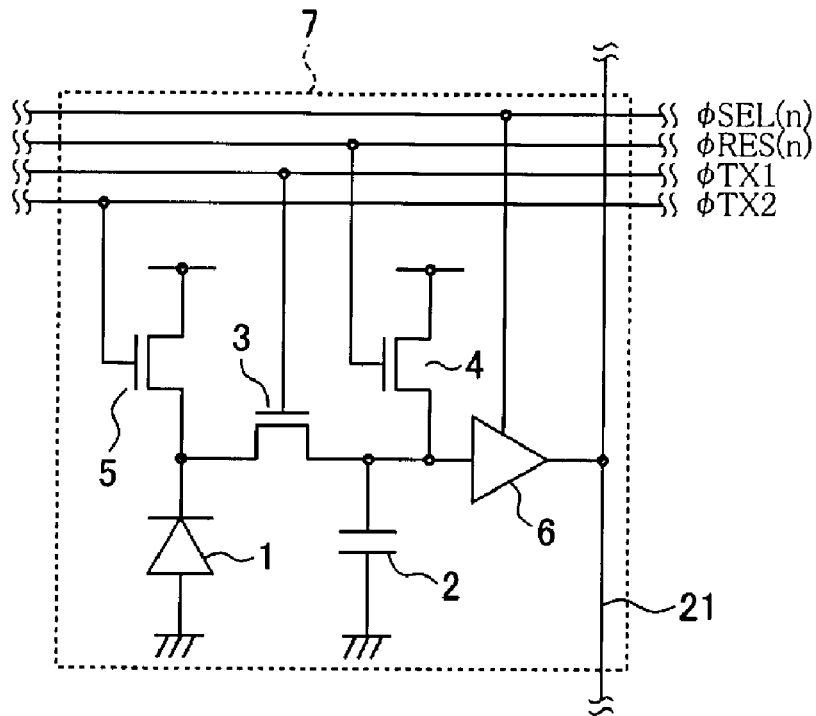
FIG. 1 is a circuit diagram showing a pixel construction of pixel section in a prior-art solid-state imaging apparatus.
Figure 2:
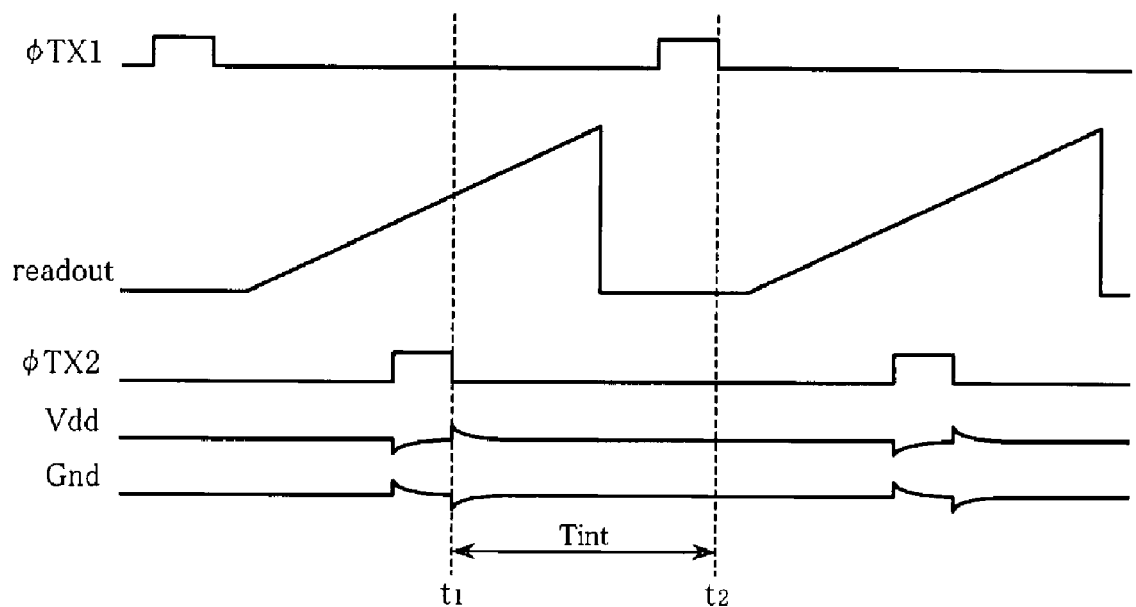
FIG. 2 is a timing chart for explaining operation in the case where a concurrent shutter operation is effected in a solid-state imaging apparatus having a pixel section of the pixel construction shown in FIG. 1.
Figure 3:
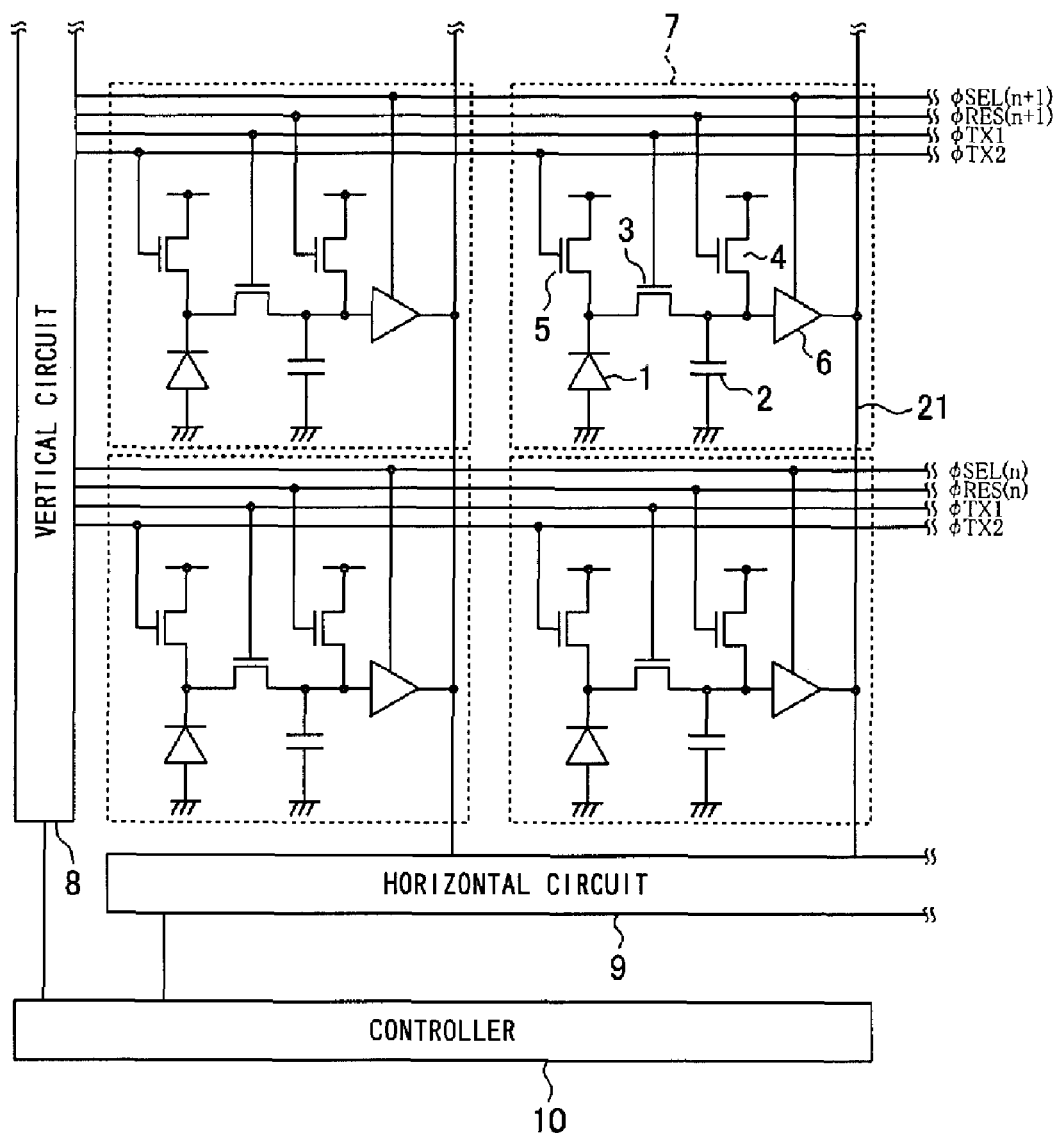
FIG. 3 is a circuit diagram showing partially in blocks the construction of a first embodiment of the solid-state imaging apparatus according to the invention.

A first embodiment of the solid-state imaging apparatus according to the invention will now be described. FIG. 3 is a schematic circuit block diagram of the solid-state imaging apparatus according to the first embodiment. FIG. 3 includes: 1, a photoelectric conversion means such as a photodiode for receiving light for a predetermined time to accumulate photoelectric charge and effect its photoelectric conversion; 2, a memory means for retaining photoelectric charge of the photoelectric conversion means 1; 3, a transfer means for transferring photoelectric charge of the photoelectric conversion means 1 to the memory means 2; 4, a reset means for resetting the memory means 2 to the potential of a power supply (corresponding to the first reset means of the above described aspects of the invention); 5, a discharging means for resetting the photoelectric conversion means 1 to the potential of a power supply (corresponding to the second reset means in the above described aspects of the invention); and 6, a read means for reading electric charge of the memory means 2. These means as described above constitute a unit pixel 7. A plurality of unit pixels each having such construction are two-dimensionally arranged to constitute a pixel section. Only a portion consisting of 2×2 or 4 pixels is shown in the illustrated example. It should be noted that what is denoted by 21 in FIG. 3 is a vertical signal line for outputting signal read out at the read means 6 of each unit pixel.

Also referring to FIG. 3, what is denoted by 8 is a vertical circuit which outputs row by row of the pixel section a transfer control signal φ TX1, reset control signal φ RES(n), discharging control signal φ TX2, and read control signal φ SEL(n), respectively, for controlling ON/OFF of the transfer means 3, reset means 4, discharging means 5, and read means 6 of each unit pixel 7.

It should be noted that suffix n in φ RES(n) and φ SEL(n) represents the location of row. What is denoted by 9 is a horizontal circuit which selects a pixel column to be read for signal and outputs signal of the pixels associated with the pixel column. Denoted by 10 is a controller for applying to the vertical circuit 8, horizontal circuit 9, and other circuits the signals for controlling their operation, which is constructed so as to effect control in accordance with an externally set signal applied from an external section.

Figure 4:
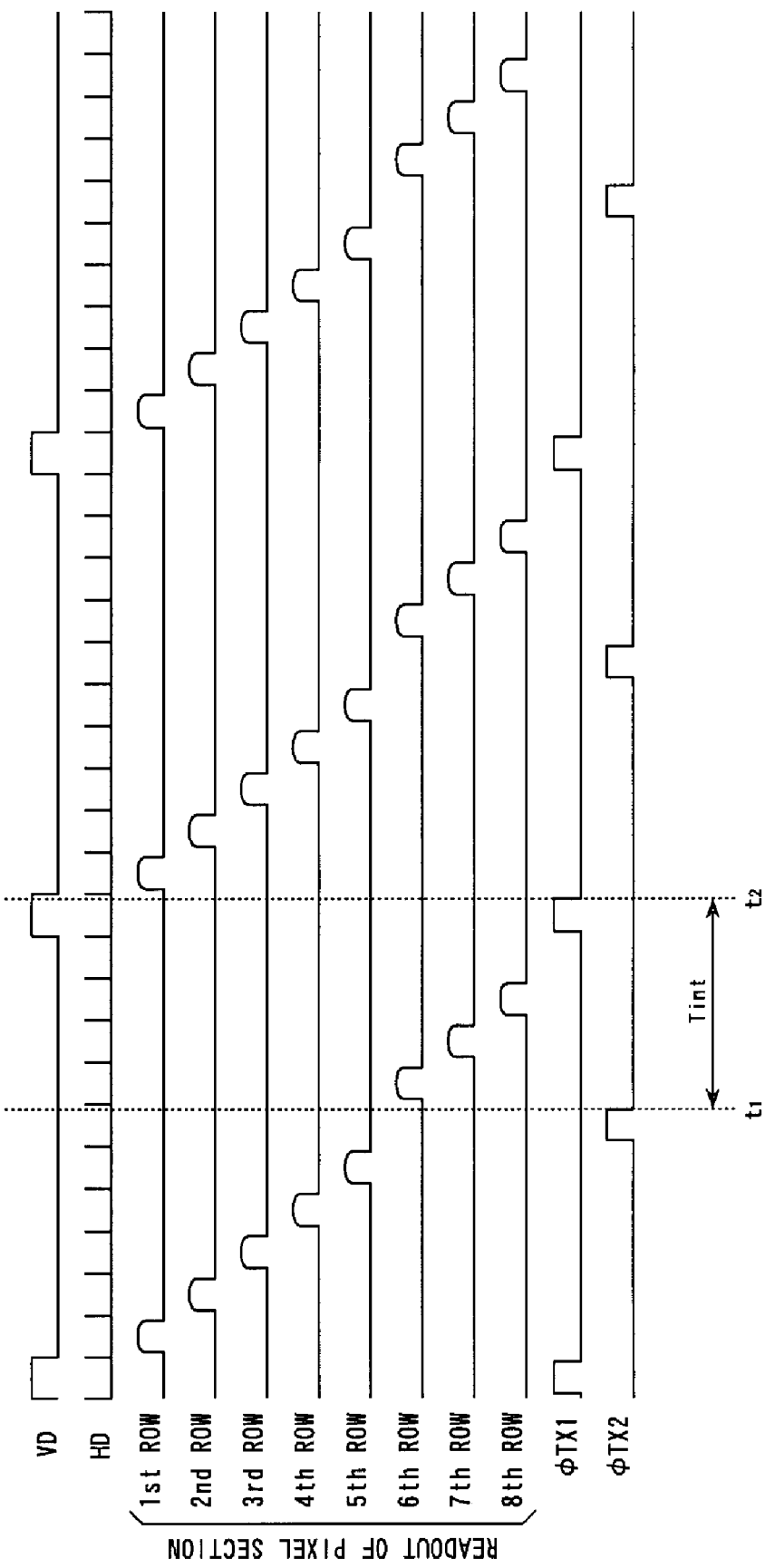
FIG. 4 is a timing chart for explaining operation of the solid-state imaging apparatus according to the first embodiment shown in FIG. 3.

An operation of the solid-state imaging apparatus according to the first embodiment shown in FIG. 3 will now be described with reference to a timing chart shown in FIG. 4. As shown in FIG. 4, the discharging control signal φ TX2 is driven to H level concurrently for all pixels so that a concurrent reset operation of all pixels by the discharging means 5 is started. After passage of a predetermined time, the discharging control signal φ TX2 is brought to low level concurrently for all pixels so that the concurrent reset operation of all pixels by the discharging means 5 is completed and exposure of all pixels is started (time point $t_1$).

After passage of a predetermined exposure time, at the timing of a concurrent transfer of all pixels, the transfer means 3 of all pixels are concurrently turned ON by the transfer control signal φ TX1. The photoelectric charges accumulated at the photoelectric conversion means 1 are thereby concurrently transferred to the memory means 2 so as to end the exposure (time point $t_2$). Here, in the timing chart shown in FIG. 4, a period indicated as Tint, i.e. period from $t_1$ to $t_2$ becomes an actual exposure period. Next after the end of the exposure, the read means 6 based on the read control signal φ SEL(n) is used to start read of signal level sequentially from the first row.

The reset control signal φ RES(n) is used such as for the resetting of the memory means 2. It should be noted that, in FIG. 4, VD represents a vertical synchronizing signal and HD horizontal synchronizing signal.

Here, in the present embodiment, the sequential read operation from the memory means 2 of each pixel 7 of the pixel section is temporarily halted by control of the controller 10 before the concurrent reset operation of all pixels by the discharging control signal φ TX2. After completion of the concurrent reset operation of all pixels by the discharging control signal φ TX2 i.e. after stabilization of fluctuation of the power supply side resulting from the concurrent reset operation, then, control is effected by the controller 10 so as to restart the read operation from the memory means 2 of the pixel section. In the illustrated example, after sequentially reading signal level up to the fifth row, the read operation is temporarily halted. After completion of the concurrent reset operation of all pixels by the discharging control signal φ TX2, the read operation of signal level of the sixth row and after is restarted. It is possible with such operation to avoid a condition where fluctuation of power supply or GND resulting from the rendering of reset operation concurrently for all pixels affects readout signal from the memory means 2 of each pixel of the pixel section.

Figure 5:
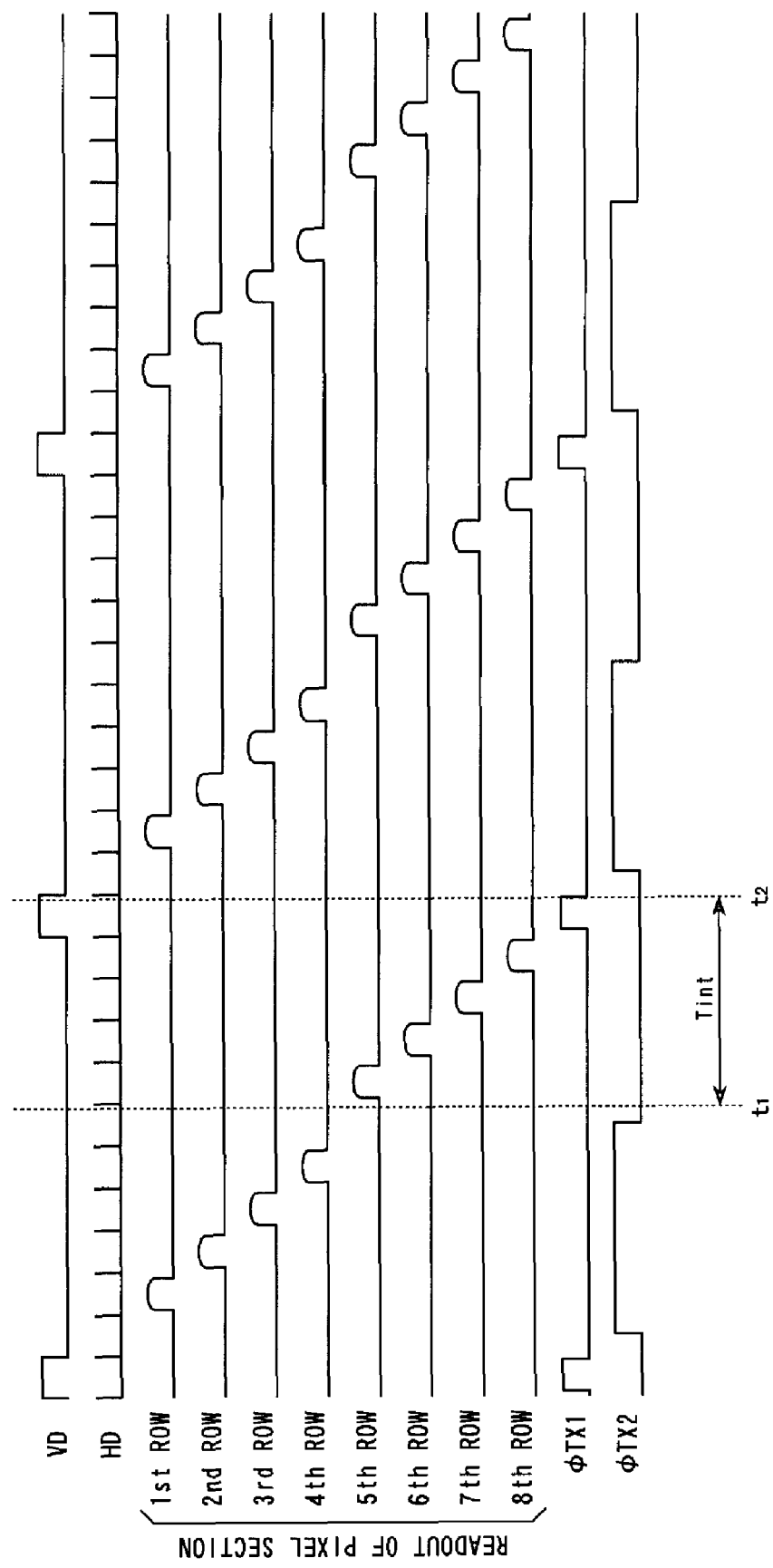
FIG. 5 is a timing chart for explaining the conditions of temporary halt and restart of signal read operation from the pixel section in the first embodiment shown in FIG. 3.

The conditions of temporary halt and restart of the signal read operation from the pixel section will now be described by way of a timing chart shown in FIG. 5. The timing chart of FIG. 5 shows the manner where the period of halting signal read from the pixel section exactly corresponds to 2 lines. Such line number may either be one line or be a plurality of lines. Control by the controller 10 is effected so that the period of halt becomes an integer multiple of 1 line period. In addition to the previously described advantage, there is an advantage that generation of synchronizing signal for driving the solid-state imaging apparatus becomes simpler and signal processing at subsequent stages is simplified.

Figure 6:
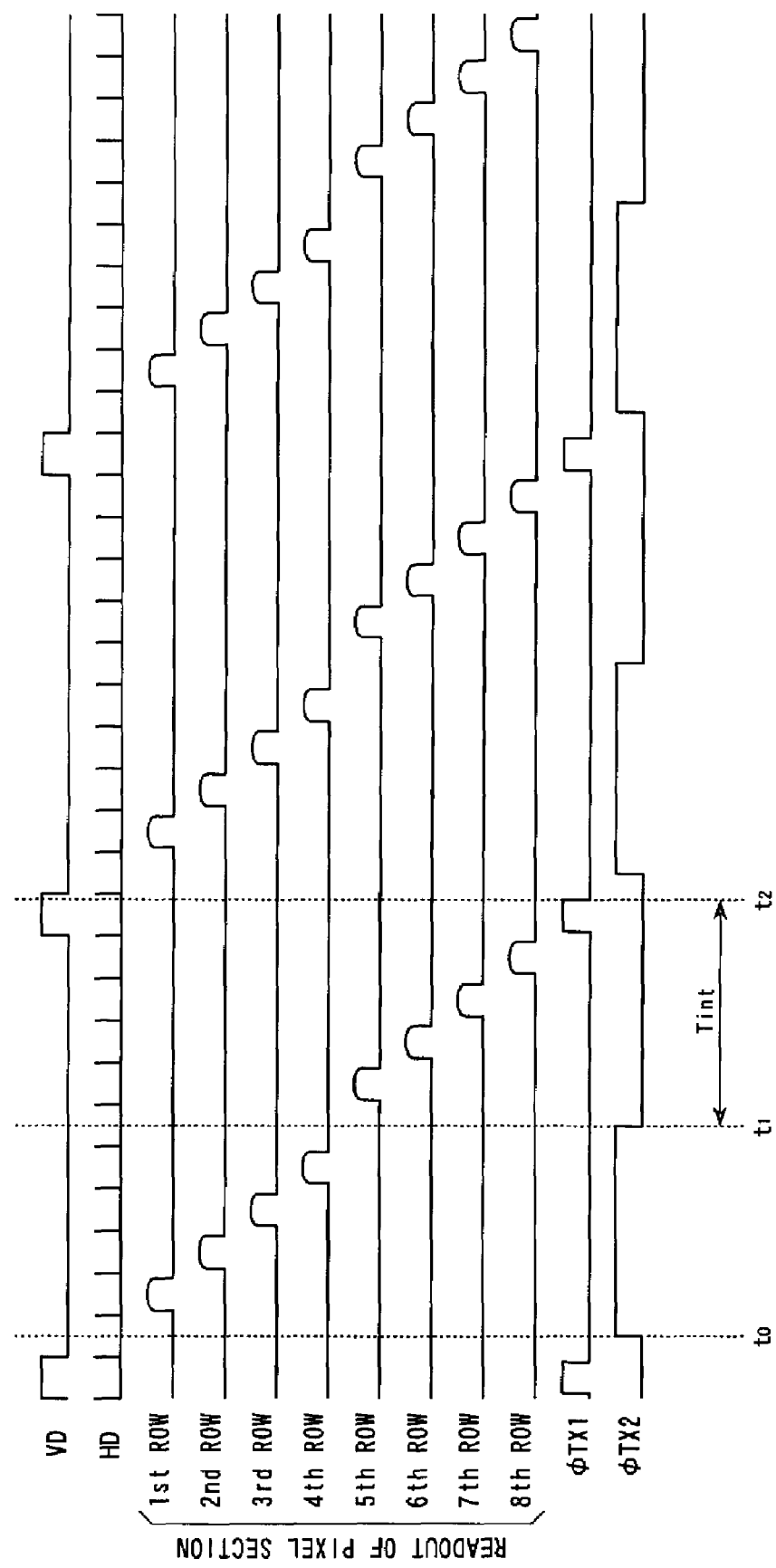
FIG. 6 is a timing chart for explaining a modification of operation in the first embodiment shown in FIG. 3.

A modification of operation in the first embodiment will now be described by way of a timing chart shown in FIG. 6. The operation shown in the timing chart of FIG. 6 is different from the operation shown in FIGS. 4 and 5 in that, before reading signal from each pixel of the pixel section, the discharging control signal φ TX2 is previously driven to H level concurrently for all pixels at time to within a vertical blanking period. In the operation of this modification, control by the controller 10 is effected so that reading of signal level with using the read means 6 based on the read control signal φ SEL(n) is started sequentially from the first pixel row of the pixel section after completion of the rising operation of the discharging control signal φ TX2. In addition, the read operation from the pixel section is temporarily halted before the falling operation of the discharging control signal φ TX2. Control is then effected by the controller 10 so that, after time point $t_1$ where the concurrent discharging operation of all pixels by the falling operation of the discharging control signal φ TX2 is complete, reading from the memory means 2 of the pixel section is started again.

It is possible with such operation to avoid a condition where fluctuation of power supply or GND resulting from the rendering of reset operation concurrently for all pixels affects readout signal from the memory means 2 of each pixel of the pixel section. In addition, the period of halting of read can be made to a minimum because it is possible to reduce the number of times of change in condition of the discharging control signal φ TX2 in the period for halting read from the pixel section. Here, an advantage equivalent to the example of operation shown in FIG. 5 is further obtained by making the delay time of start of read of the first row of the pixel section and/or halting period within the read period of the pixel section to 1 line period or an integer multiple of 1 line period.

Embodiment 2

Figure 7:
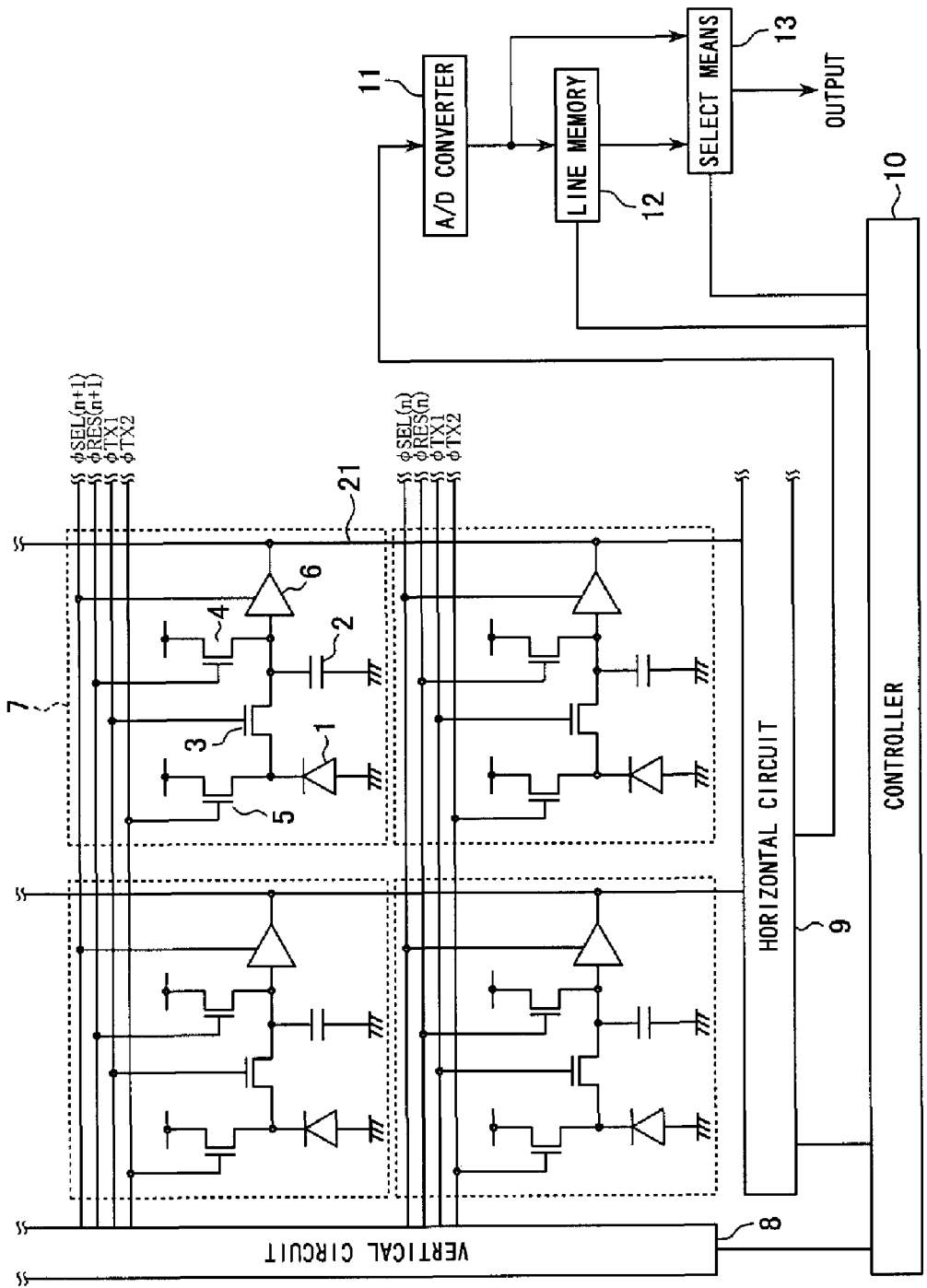
FIG. 7 is a block diagram showing construction of the solid-state imaging apparatus according to a second embodiment of the invention.

A second embodiment of the solid-state imaging apparatus according to the invention will now be described by way of FIG. 7. The difference in construction of the solid-state imaging apparatus according to the second embodiment from the solid-state imaging apparatus according to the first embodiment is as follows. In particular, there are additions of: A/D converter 11 for A/D conversion of signal read out from the read means 6 of each pixel through the horizontal circuit 9; a line memory 12 for delaying signal A/D-converted at the A/D converter 11; and a select means 13 for selecting between signals from the A/D converter 11 and the line memory 12. The operation of the line memory 12 and the select means 13 is controlled at the controller 10. The construction of the rest is identical to the first embodiment.

Figure 8:
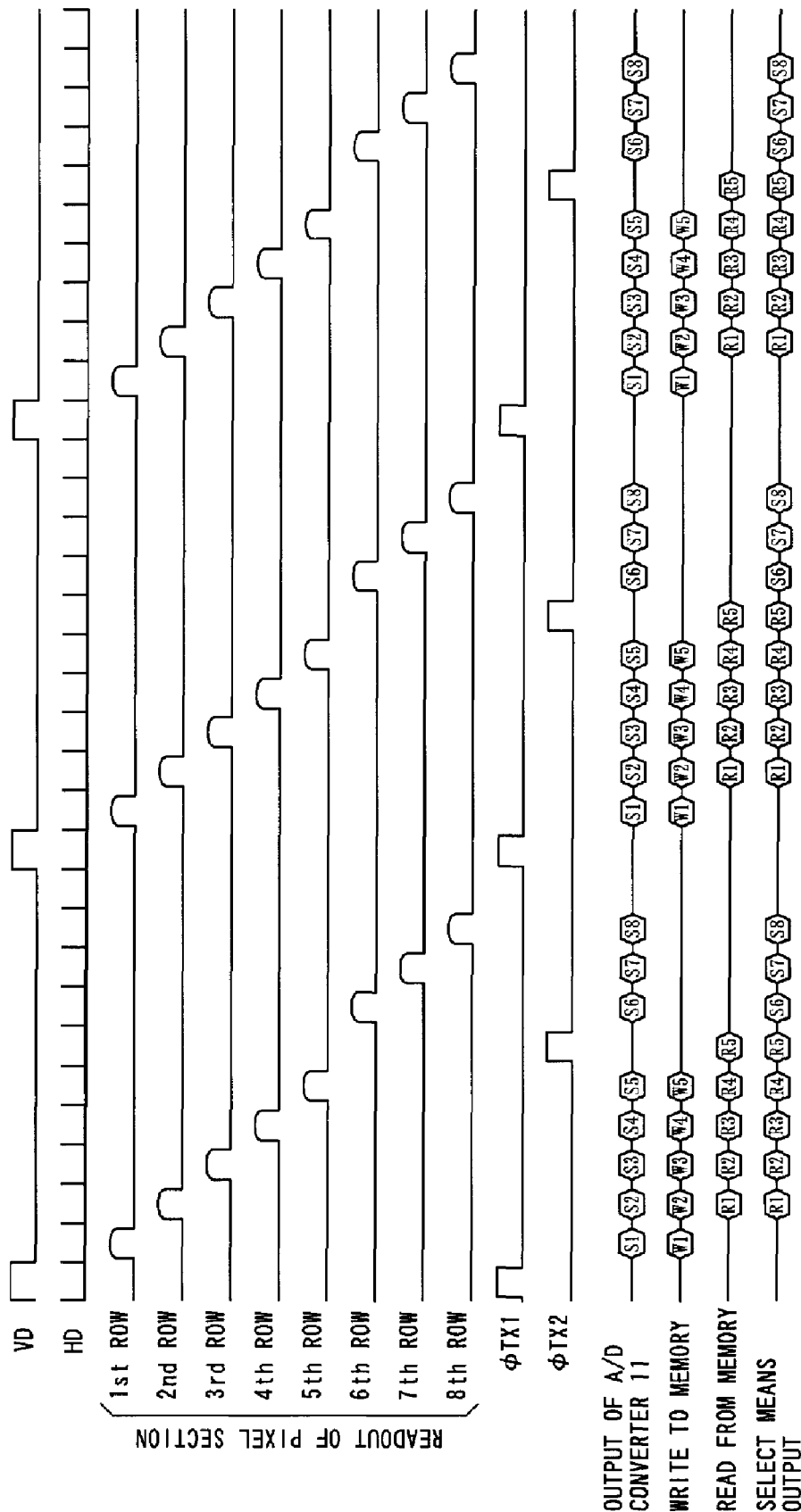
FIG. 8 is a timing chart for explaining operation of the second embodiment shown in FIG. 7.

An operation of the solid-state imaging apparatus according to the second embodiment will now be described with reference to a timing chart shown in FIG. 8. Referring to FIG. 8, the blocks indicated as S1, S2, S3, ..., S8 in the section of "output of A/D converter 11" represent timings of the outputting of signals which are read out from the read means 6 of each pixel through each vertical signal line 21 and the horizontal circuit 9 and converted into digital signals at A/D converter 11. This timing chart shows the manner where the halting period of signal readout from the pixel section exactly corresponds to 1 line. Further, the line memory 12 is constructed so as to cause a delay corresponding to 1 line.

In the timing chart of FIG. 8, the section of "write to memory" indicates the timings for writing output of the A/D converter 11 to the line memory 12 by W1, W2, ..., W5, and the section of "read from memory" indicates the timings of signal output delayed by the line memory 12 by R1, R2, ..., R5. Since control is effected by the controller 10 so that the delay time of the line memory 12 becomes 1 line period, the memory readout is outputted as shifted exactly corresponding to one line with respect to the memory write.

Here, the select means 13 is controlled by the controller 10 so that it selects signal of the line memory 12 until completion of the operation of the discharging control signal φ TX2, and selects an output signal of the A/D converter 11 after completion of the operation of the discharging control signal φ TX2. With such selecting operation, the timings of output of the select means 13 become consecutive R1, R2, ..., R5, S6, S7, S8. Accordingly, consecutiveness of signals is maintained so that it is possible to achieve simplification of signal processing at subsequent stages.

Figure 9:
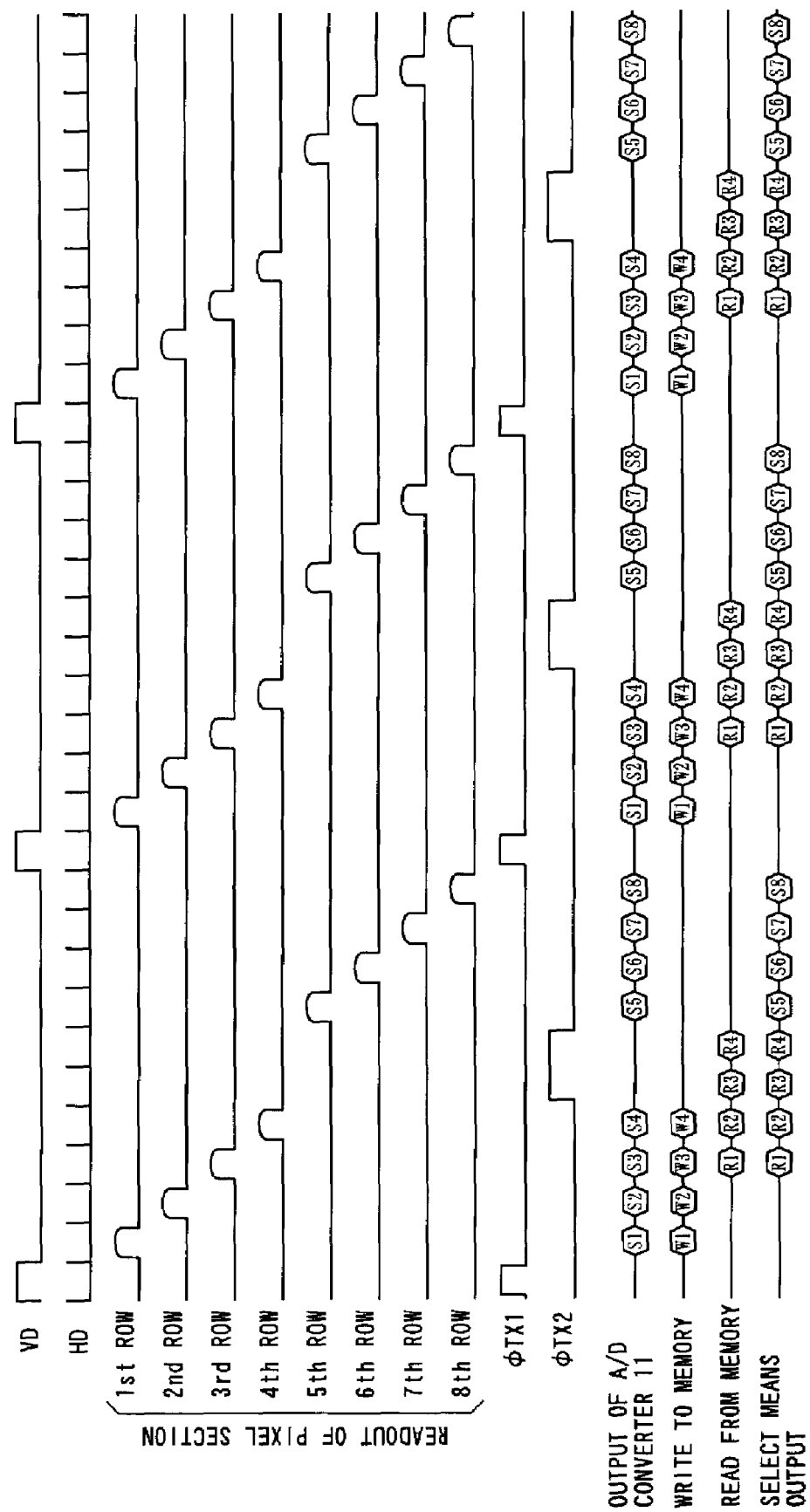
FIG. 9 is a timing chart for explaining the conditions of temporary halt and restart of signal read operation from the pixel section in the second embodiment shown in FIG. 7.

The conditions of temporary halt and restart of the signal read operation from the pixel section in the second embodiment will now be described by way of a timing chart shown in FIG. 9. The timing chart of FIG. 9 shows the manner where the period of halting the signal readout from the pixel section exactly corresponds to 2 lines. Such line number may either be one line or be a plurality of lines. Control by the controller 10 is effected so that the period of halt becomes an integer multiple of 1 line period, and the delay time of the line memory 12 is adjusted to be the same as the period during which signal readout is halted. In addition to the previously described advantage, it is thereby possible to obtain an advantage that a generation of synchronizing signal for driving the solid-state imaging apparatus becomes simpler and a signal processing at subsequent stages is further simplified.

Figure 10:
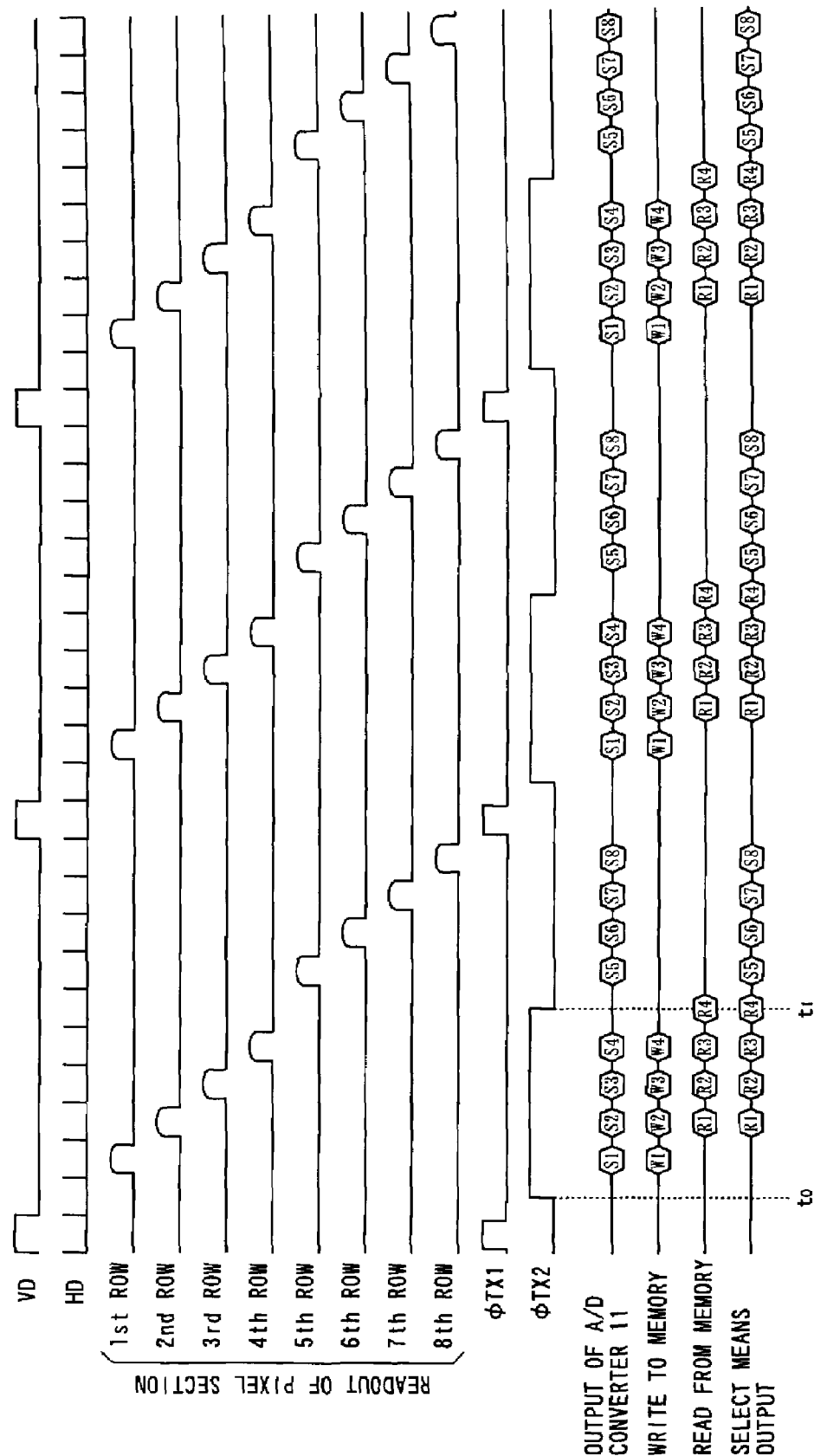
FIG. 10 is a timing chart for explaining a modification of operation in the second embodiment shown in FIG. 7.

A modification of operation in the second embodiment will now be described by way of a timing chart shown in FIG. 10. The difference of the operation shown in the timing chart of FIG. 10 from the operation shown in FIGS. 8 and 9 is in that, before reading signal from each pixel of the pixel section, the discharging control signal φ TX2 is previously driven to H level concurrently for all pixels at time $t_0$. In the operation of this modification, control by the controller 10 is effected so that read of signal level with using the read means 6 based on the read control signal φ SEL(n) is started sequentially from the first pixel row of the pixel section after completion of the rising operation of the discharging control signal φ TX2. In addition, the read operation from the pixel section is temporarily halted before the falling operation of the discharging control signal ϕ TX2. The readout from the memory means 2 of the pixel section is then started again after time $t_1$ where the concurrent reset operation of all pixels by the falling operation of the discharging control signal ϕ TX2 is complete, and control of write and read to and from the line memory 12 is effected by the controller 10.

It is possible with such operation to avoid a condition where fluctuation of power supply or GND resulting from the rendering of reset operation concurrently for all pixels affects readout signal from the memory means 2 of each pixel of the pixel section. In addition, the period of halting of read can be made to a minimum because it is possible to reduce the number of times of change in condition of the discharging control signal ϕ TX2 in the period for halting read from the pixel section. Here, an advantage equivalent to the example of operation shown in FIG. 9 is further obtained by making the delay time of start of read of the first row of the pixel section and/or halting period within the read period of the pixel section to 1 Line period or an integer multiple of 1 line period.

Embodiment 3

Figure 11:
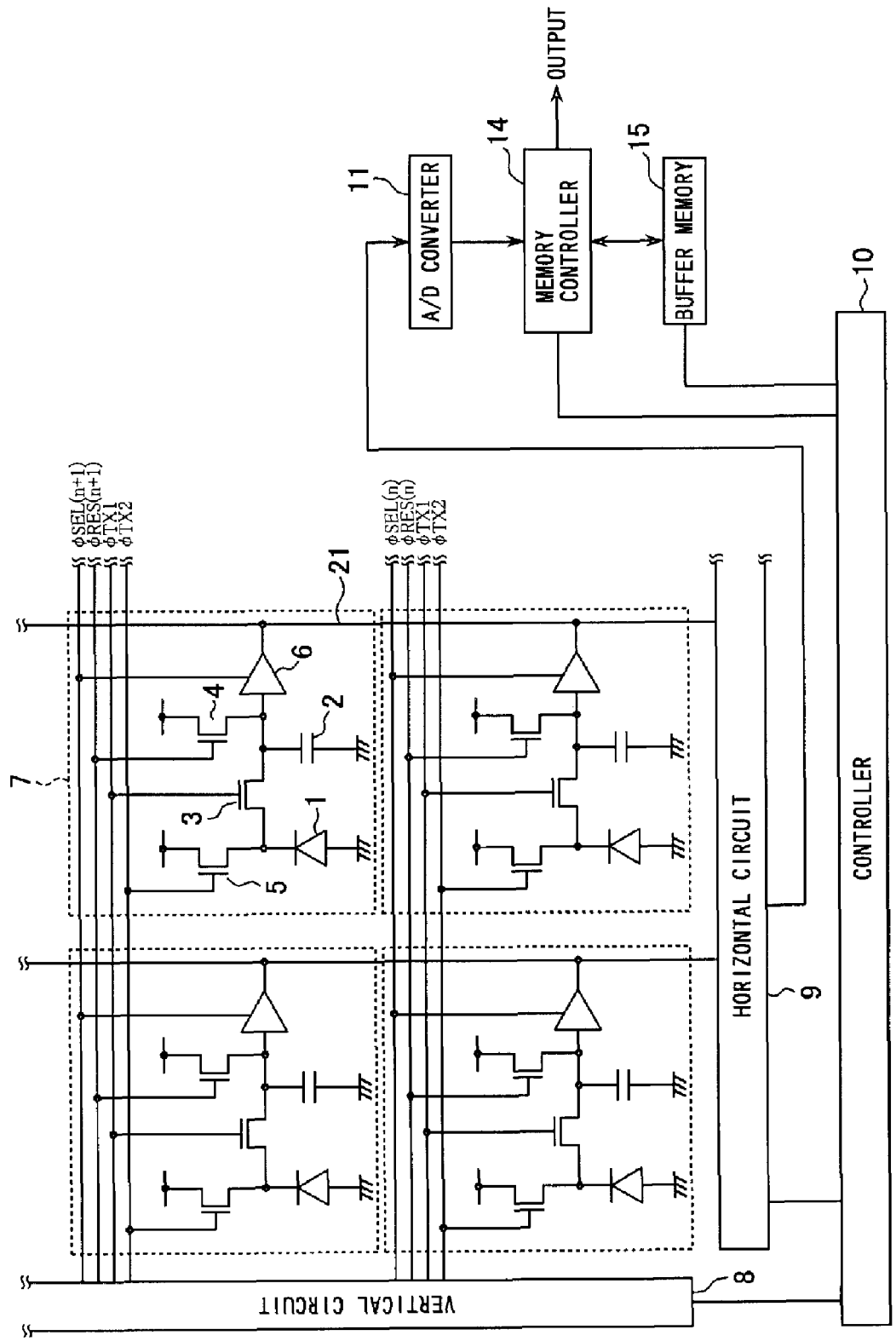
FIG. 11 is a block diagram showing construction of the solid-state imaging apparatus according to a third embodiment of the invention.

A third embodiment of the solid-state imaging apparatus according to the invention will now be described by way of FIG. 11. The difference in construction of the solid-state imaging apparatus according to the third embodiment from the solid-state imaging apparatus according to the first embodiment is as follows. In particular, there are additions of: A/D converter 11 for A/D conversion of signal read out from the read means 6 of each pixel through the horizontal circuit 9; a buffer memory 15 for temporarily storing signals A/D-converted at the A/D converter 11; and a memory controller 14 for controlling the buffer memory 15. The operation of the memory controller 14 is controlled at the controller 10. The construction of the rest is identical to the first embodiment.

Figure 12:
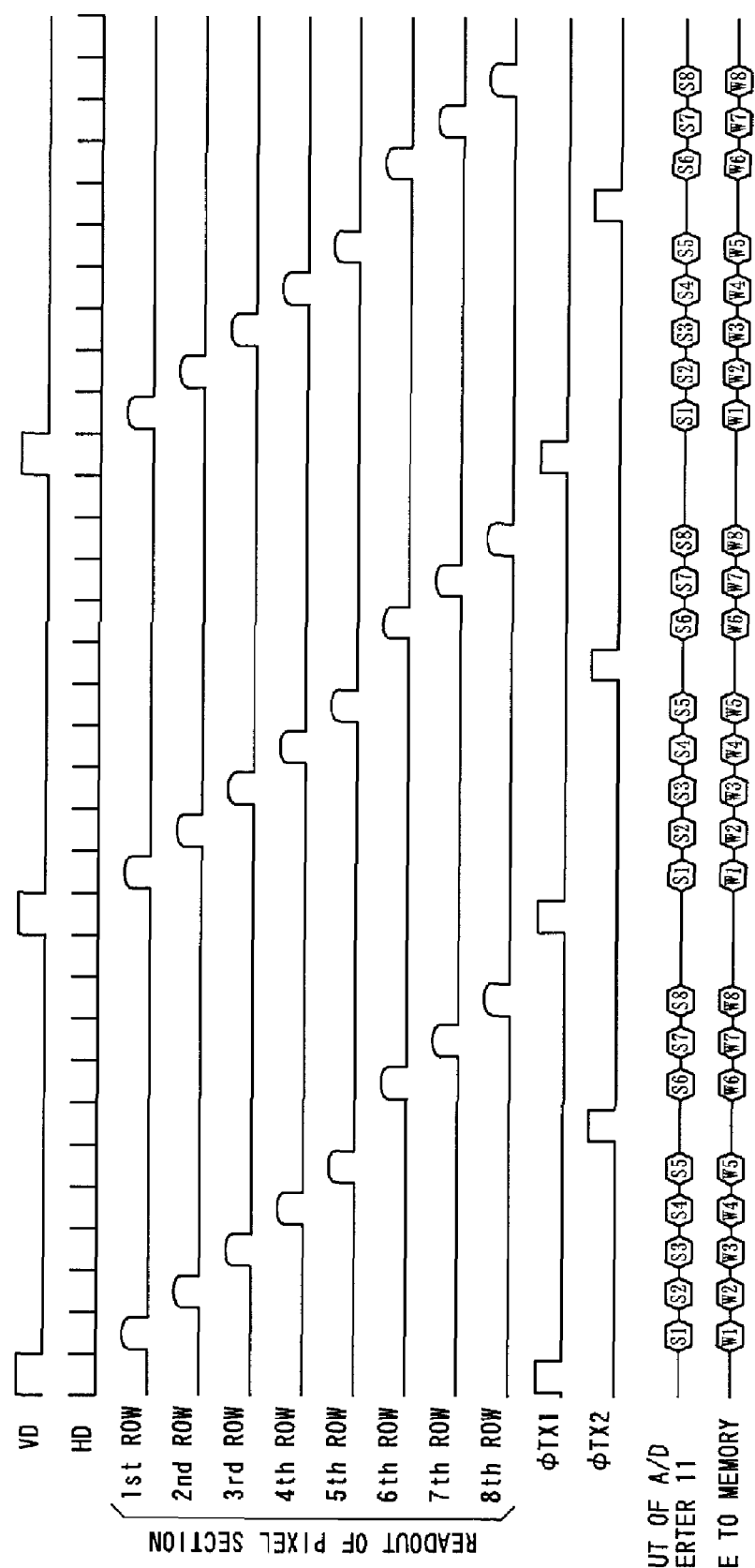
FIG. 12 is a timing chart for explaining operation of the third embodiment shown in FIG. 11.

An operation of the solid-state imaging apparatus according to the third embodiment will now be described with reference to a timing chart shown in FIG. 12. Referring to FIG. 12, the blocks indicated as S1, S2, S3, ..., S8 in the section of "output of A/D converter 11" represent timings of the outputting of signals which are read out from the read means 6 of each pixel through the horizontal circuit 9 and converted into digital signal at A/D converter 11. This timing chart shows the manner where the halting period of signal readout from the pixel section exactly corresponds to 1 line.

In FIG. 12, the section of "write to memory" indicates the timings of writing output of A/D converter 11 to the buffer memory 15 as W1, W2, ..., W8, and the write to the buffer memory 15 is effected by the memory controller 14. Here, control is effected by the controller 10 so that the memory controller 14 effects the write to the buffer memory 15 within the period of signal readout from the pixel section while, on the other hand, stops the write to the buffer memory 15 in the period during which the signal readout is halted, and starts the write to the buffer memory 15 again upon restart of the signal readout.

With such operation, in addition to the previously described advantage according to the first embodiment, the consecutiveness of signals written to the buffer memory 15 is maintained so that it is possible to achieve simplification of the signal processing at subsequent stages. It should be noted that, while the second and third embodiments have been shown as those where A/D conversion is effected by A/D converter 11 on the output from the horizontal circuit 9, it is naturally also possible to obtain an equivalent advantage for example by construction where A/D conversion is effected with a column-by-column correspondence within the horizontal circuit 9.

Embodiment 4

In the above described embodiments, the examples have been shown of construction where the invention is applied to one using a concurrent shutter method in readout of the entire region of a pixel section. The high-speed read methods of pixels, now, include thinned-out read and method of reading an optional partial region. In a fourth embodiment, the invention is applied to one using such read methods. It should be noted that the construction itself of the solid-state imaging apparatus in this embodiment is identical to those in the foregoing embodiments.

FIG. 13 explains the manner where the pixel section is read out with thinning out every other two rows. When such thinned-out read is effected, a reset operation of the unread pixel rows is usually also omitted. For this reason, the electric charges accumulated at the photoelectric conversion means such as photodiode sooner or later reach a saturation charge amount. The electric charges occurring in excess of the saturation charge amount flow for example into photoelectric conversion means of adjacent pixels and causes an occurrence of spurious signal at the adjacent pixels. To solve this problem, the reset operation by the discharging control signal ϕ TX2 of the photoelectric conversion means is concurrently effected also for those pixel rows which are not read out in the thinned-out read operation.

Also in the case where the reset operation for a concurrent shutter operation is concurrently effected also for these pixel rows which are not read out in the thinned-out read operation as described, the present embodiment is constructed so that the read operation by the read means is temporarily halted in the manner shown in the above first to third embodiments when a concurrent reset operation is to be effected by the discharging control signal ϕ TX2 during a read operation of signal based on the above concurrent shutter method. It is thereby possible to avoid an effect of fluctuation of power supply on readout signal so as to prevent deterioration of image quality.

Figure 15:
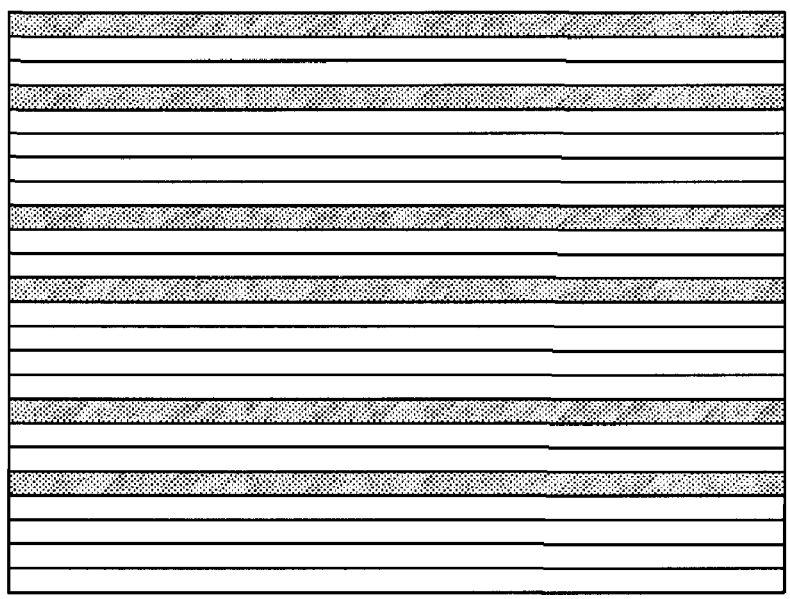
FIG. 15 explains yet another manner of thinned-out readout in the fourth embodiment.

Further, also in the case of thinned-out read of every third pixel as shown in FIG. 14 or of thinned-out read of combining every third pixel and every fifth pixel as shown in FIG. 15, the read operation by the read means is similarly halted so as to effect a concurrent reset operation by the discharging control signal ϕ TX2 with including those pixel rows which are not read out.

Figure 16:
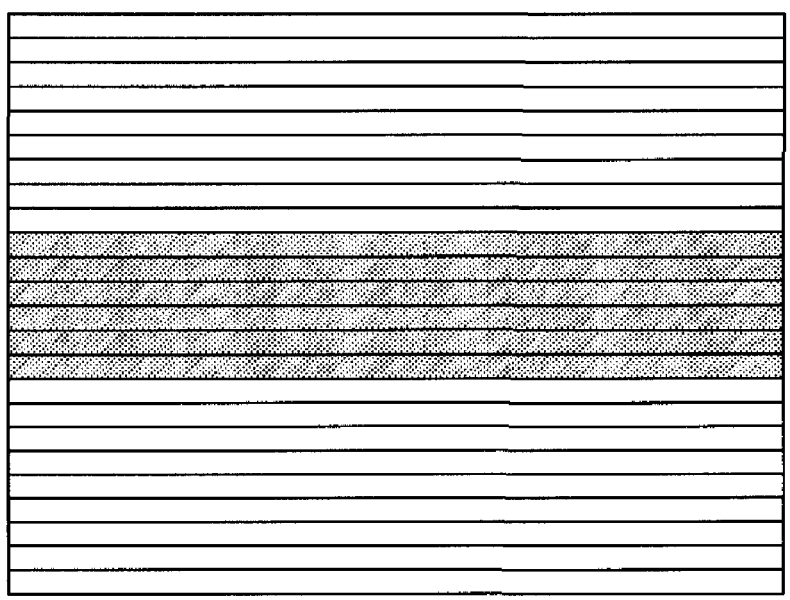
FIG. 16 explains a manner of optional region readout in the fourth embodiment.

Furthermore, also when an optionally selected partial region is to be read out as shown in FIG. 16, a reset of the unread pixel rows usually is not effected, whereby the electric charges accumulated at photoelectric conversion means of such unread pixel rows reach a saturation electric charge amount sooner or later after photoelectric conversion. The electric charges occurring in excess of the saturation charge amount then flow for example into adjacent photoelectric conversion means and causes an occurrence of spurious signal in adjacent pixels.

To prevent this, the reset operation by the discharging control signal ϕ TX2 of the photoelectric conversion means is effected also on the unread pixel rows or on peripheral pixels rows of the optional readout region (for example lines 8~9 and lines 16~17 in the illustrated example where the readout region is determined as lines 10 to 15).

Also in the case where the reset operation for concurrent shutter operation is concurrently effected as the above also on those pixel rows which are not read out in the optional region read operation or on peripheral pixel rows of an optional region to be read, the present embodiment is constructed to temporarily halt the read operation by the read means in the manner shown in the above first to third embodiments when a concurrent reset operation is effected by the discharging control signal φ TX2 during a read operation of signals based on the above concurrent shutter method. It is thereby possible to similarly avoid an effect of fluctuation of power supply on readout signal so as to prevent deterioration of image quality.

According to the invention as has been described by way of the above embodiments, when a concurrent reset by the second reset means is to be effected in a period for read by the read means, a control by the controller is effected so that a read by the read means is temporarily halted at least at one or the other of the timings of start and release of the concurrent reset by the second reset means. An effect on readout signal caused by fluctuation of power supply and/or GND occurring due to the rendering of the reset operation concurrently for all pixels is thereby avoided to prevent a deterioration of an image quality.

What is claimed is:

1. A solid-state imaging apparatus comprising:
a pixel section having two-dimensionally arranged pixels, each having a photoelectric conversion means, a memory means for storing a photoelectric conversion signal of said photoelectric conversion means, a transfer means for transferring said photoelectric conversion signal to said memory means, a first reset means for resetting said memory means, a second reset means driven independently from the first reset means for resetting said photoelectric conversion means, and a read means for reading the photoelectric conversion signal of said memory means; and
a controller for effecting a control so that, after passage of a predetermined time subsequently to the rendering of a concurrent reset by said second reset means on said photoelectric conversion means of all pixels in a read subject region, a transfer of said photoelectric conversion signal is concurrently effected by said transfer means from said photoelectric conversion means to said memory means of all pixels in said read subject region, and a reading of said photoelectric conversion signal stored at said memory means is effected by said read means,
wherein when said concurrent reset by said second reset means is effected in a period during which the reading by said read means is effected, the reading by said read means is temporarily halted at least at one or the other of timings of a start and a release of the concurrent reset by said second reset means, and
wherein said controller causes the reading by said read means to start in a period, which is after a predetermined period from the completion of a rising operation of the concurrent reset by said second reset means, wherein the reading is temporarily halted in a period before a falling operation of the concurrent reset by said second reset means, and wherein the reading is restarted in a period which is after the falling operation of the concurrent reset.

2. The solid-state imaging apparatus according to claim 1, wherein said controller sets a period of said temporary halt by a unit of readout line of said pixel section.

3. The solid-state imaging apparatus according to claim 1, wherein said controller sets the start of the concurrent reset by the second reset means within a vertical blanking period.

4. The solid-state imaging apparatus according to claim 1, wherein said controller causes the concurrent reset by said second reset means to be effected with including a region not subjected to reading outside the read subject region.

5. The solid-state imaging apparatus according to claim 1 further comprising an A/D converter for converting said photoelectric conversion signal into a digital signal, a line memory for effecting a delay of said digital signal for a period corresponding to the period of said temporary halt, and a select means for selecting between an output of said A/D converter and an output of said line memory,
wherein said controller controls said select means so that an output of said line memory is selected and outputted until a release of said temporary halt and an output of said A/D converter after the release.

6. The solid-state imaging apparatus according to claim 1 further comprising an A/D converter for converting said photoelectric conversion signal into a digital signal, and a buffer memory for transiently storing said digital signal,
wherein said controller causes to halt the storing of said digital signal to said buffer memory for a period corresponding to the period of said temporary halt.

* * * * *